(12) United States Patent
Pons Semelis et al.

(10) Patent No.: US 10,987,608 B2
(45) Date of Patent: Apr. 27, 2021

(54) LIQUID-DISTILLING DEVICE

(71) Applicants: Joan Pons Semelis, Barcelona (ES); Sergi Valls Bofill, Barcelona (ES)

(72) Inventors: Joan Pons Semelis, Barcelona (ES); Sergi Valls Bofill, Barcelona (ES)

( * ) Notice: Subject to any disclaimer, the term of this patent is extended or adjusted under 35 U.S.C. 154(b) by 0 days.

(21) Appl. No.: 16/491,755

(22) PCT Filed: Mar. 7, 2018

(86) PCT No.: PCT/ES2018/070166
§ 371 (c)(1),
(2) Date: Sep. 6, 2019

(87) PCT Pub. No.: WO2018/162777
PCT Pub. Date: Sep. 13, 2018

(65) Prior Publication Data
US 2020/0038775 A1 Feb. 6, 2020

(30) Foreign Application Priority Data

Mar. 8, 2017 (ES) ................. ES201730305

(51) Int. Cl.
*B01D 3/00* (2006.01)
*B01D 1/00* (2006.01)
(Continued)

(52) U.S. Cl.
CPC ........... *B01D 3/007* (2013.01); *B01D 1/0035* (2013.01); *B01D 3/02* (2013.01); *B01D 5/0066* (2013.01);
(Continued)

(58) Field of Classification Search
CPC ........ B01D 1/0035; B01D 3/00; B01D 3/007; B01D 3/02; B01D 5/0066; C02F 1/14; C02F 2103/08; C02F 2303/10
See application file for complete search history.

(56) References Cited

U.S. PATENT DOCUMENTS 3,699,006 A   10/1972   Hasslacher
6,010,599 A    1/2000   Wang et al.

FOREIGN PATENT DOCUMENTS

DE   28 00 612 A1    7/1979
DE   31 22 312 A1   12/1982
(Continued)

OTHER PUBLICATIONS

WIPO English translation of Wang (CN203360034) published Dec. 25, 2013.*
(Continued)

*Primary Examiner* — Brian A McCaig
(74) *Attorney, Agent, or Firm* — Maier & Maier, PLLC

(57) ABSTRACT

A liquid distiller device. The device includes a dome impermeable to steam, configured to host the liquid to be distilled in an inferior part of its volume; a heat pump arranged in the interior of the dome and provided with a condenser which releases heat and an evaporator which absorbs heat, respectively conforming a hot part and a cold part of the heat pump; a radiator connected to the hot part of the heat pump, suitable for evaporating the liquid to be distilled; a condenser deposit connected to the cold part of the heat pump and suitable for condensing the evaporated liquid and collecting the distillate and; a collector tube, connected to the condenser deposit for the exit of the distillate.

2 Claims, 1 Drawing Sheet

(51) Int. Cl.
*B01D 3/02* (2006.01)
*B01D 5/00* (2006.01)
*C02F 1/14* (2006.01)
C02F 103/08 (2006.01)

(52) U.S. Cl.
CPC ............ *C02F 1/14* (2013.01); *C02F 2103/08* (2013.01); *C02F 2303/10* (2013.01); *F25B 2313/00* (2013.01)

(56) References Cited

FOREIGN PATENT DOCUMENTS

DE 40 11 877 A1 10/1991
DE 103 05 424 A1 8/2004

OTHER PUBLICATIONS

Schaschke, C. (2014) Dictionary of Chemical Engineering, Oxford University Press, 432 pgs [Office action cites "heat pump"].*
International Search Report and Written Opinion of the International Searching Authority dated Jun. 13, 2018 in corresponding International application No. PCT/ES2018/070166; 12 pages.
International Report on Patentability dated Apr. 9, 2019 in corresponding International application No. PCT/ES2018/070166; 21 pages.
Written Opinion of the International Preliminary Examining Authority dated Jan. 30, 2019 in corresponding International application No. PCT/ES2018/070166; 9 pages.

* cited by examiner

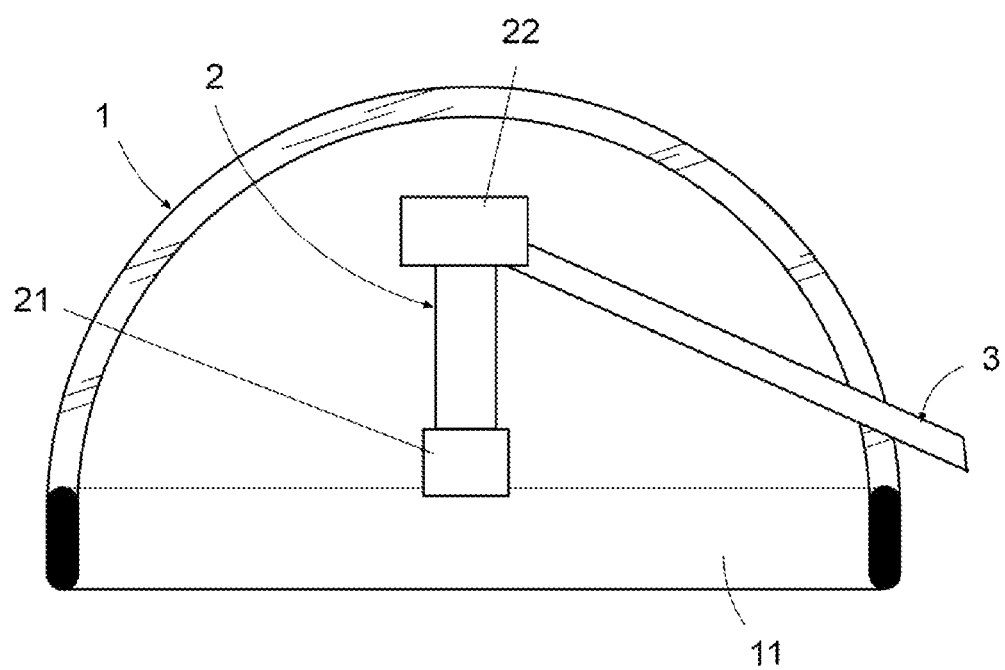

LIQUID-DISTILLING DEVICE

FIELD

The object of the present invention is a liquid distiller device which has characteristics oriented towards obtaining a greater energy efficiency than other distillation equipment existing in the market.

This invention is applicable in the distillation of liquids intended for various fields such as food, medicine, laboratory, dietetics or any other in which the use of liquid distillers is required, under suitable hygienic conditions and without impurities.

BACKGROUND

Currently different techniques exist for liquid treatment, such as water, the final purpose of which is the purification of the liquid in question, and the elimination of organic substances such as micropollutants and multivalent ions. Amongst these techniques it is appropriate mentioning for example: microfiltration, ultrafiltration, nanofiltration, and distillation.

In the distillation of liquids, which is the technique that holds a greater relationship with the present invention, domestic utensils are used, which consist of a recipient in which the evaporation of a liquid occurs by heat contribution, said recipient having a cover in which the steam condenses, and an outlet conduit for the condensed and distilled liquid.

A disadvantage of this type of distillers is that the heat necessary for the evaporation is applied to the exterior of the recipient, which entails a waste of a significant part of the utilized energy and consequently a low energy efficiency.

Another known device for the distillation of liquids, for example saltwater or drinking water, is a solar distiller which consists of a deposit inside of which the evaporation of the liquid to be distilled is produced by solar energy heating; said deposit having an inclined cover through which the drops of the condensed steam, on the internal surface of the same, descend towards an evacuation conduit for the distilled liquid.

This type of device has the advantage of using solar energy for its operation, but under the influence of atmospheric conditions it may have a very low production of distilled liquid.

Therefore, the technical problem that arises is the development of a liquid distiller device which guarantees a high production of distilled liquid independently of the external conditions and with a greater energy efficiency than the distillation equipment existing in the market.

SUMMARY

For achieving the aforementioned objectives this liquid distiller device comprises:

A dome impermeable to steam, configured to hold the liquid to be distilled in an inferior part of its volume;

a heat pump arranged in the interior of the dome, connected to an external power source, and provided with a condenser which releases heat and an evaporator which absorbs heat, respectively conforming a hot part and a cold part of the heat pump;

a radiator connected to the hot part of the heat pump, suitable for evaporating the liquid to be distilled;

a condenser deposit connected to the cold part of the heat pump and suitable for condensing the evaporated liquid and collecting the distillate and;

a collector tube, connected to the condenser deposit and suitable for conducting the distillate to the exterior of the dome.

The arrangement of the heat pump and the radiator and the condenser deposit in the interior of the dome contributes to a series of advantages:—the heat released by the hot part of the heat pump and used in the radiator accelerates the formation of steam in the interior of the dome;—the dome, apart from producing a greenhouse effect increasing the temperature, prevents the steam from escaping, allowing it to reach saturation (100% of relative humidity when referring to water steam); and—on the cold part the lower temperature causes the condensation of the steam maintaining saturation. These characteristics allow the device to achieve, therefore, a greater energy efficiency than other distillation devices by using the greenhouse effect, always working with a saturated steam and using the energy of the pump to evaporate and condense mainly.

In an embodiment of the invention the dome has an inferior opening conforming an access to its interior for the liquid to be distilled.

The use of this liquid distiller device is very simple, since it allows deploying/mounting of the dome on the surface where it is required to operate (for example salt water, non-drinkable water, etc.); activating the heat pump using the most convenient energy source according to the location (solar, wind, marine, the grid, or any other) and then collecting the distilled liquid, until the surface stops providing it in case it has dried up.

BRIEF DESCRIPTION OF FIGURES

For complementing the description that is being done and for the purpose of facilitating the understanding of the characteristics of the invention, the present descriptive specification is accompanied by a set of drawings in which, with a descriptive and non-limiting character, the following has been presented:

FIG. 1 shows a schematic view of an exemplary embodiment of the distiller device, in which the dome has been sectioned by a vertical plane.

DETAILED DESCRIPTION

In the exemplary embodiment shown in the attached figure the liquid distiller device comprises a dome (1), transparent and impermeable to steam, in which it can be found hosted a heat pump (2) provided with a condenser which releases heat and with an evaporator which absorbs heat, respectively conforming a hot part to which a radiator (21) is connected and a cold part to which a condenser deposit (22) provided with a collector tube (3) for the exit of the distillate is connected.

The aforementioned heat pump (2) is connected to an external power source (not shown) which preferably uses a renewable energy such as solar, wind or marine energy, although it is not ruled out that it can be found connected to an electric supply grid.

The aforementioned dome (1) exhibits an inferior opening (11) conforming an access to its interior for the liquid to be distilled; specifically in this example it has a hemispherical configuration open at its base, so that it can be arranged on the surface where it is required to operate; for example saltwater, non-drinkable water or any other liquid.

During the operation of the heat pump (2) the radiator (21) causes the evaporation of the liquid to be distilled in the interior of the dome (1). The steam is retained in the interior of the dome (1) and cooled and condenses in the condenser deposit (22); the liquid being condensed and distilled is evacuated to the exterior by the collector tube (3).

Having sufficiently described the nature of the invention, as well as an example of a preferred embodiment, it is stated for the appropriate purposes that the materials, form, size and arrangement of the described elements can be modified, provided that this does not entail an alteration of the essential characteristics of the invention which are claimed below.

The invention claimed is:

1. A liquid distiller device working under atmospheric conditions, comprising: a dome which is transparent, impermeable to steam, and which increases a temperature by greenhouse effect, the dome configured to host a liquid to be distilled in an inferior part of its volume; the dome further comprising:
   a heat pump connected to an external power source and arranged in the interior of the dome and provided with a condenser which releases heat and an evaporator which absorbs heat, respectively conforming a hot part and a cold part of the heat pump;
   a radiator connected to the hot part of the heat pump, suitable for evaporating the liquid to be distilled;
   a condenser deposit connected to the cold part of the heat pump and suitable for condensing the evaporated liquid and collecting the distillate and;
   a collector tube, connected to the condenser deposit for the exit of the distillate, wherein the dome of the liquid distiller device exhibits an inferior opening conforming both an access to its interior for the liquid to be distilled and a reservoir for holding the liquid to be distilled, and is portable and deployable on an operating surface.

2. A process for obtaining distilled liquids using the liquid distiller device of claim 1, comprising:
   a) deploying/mounting the dome on the surface where it is required to operate,
   b) activating the heat pump and
   c) collecting the distilled liquid.

* * * * *